United States Patent [19]

Wullschleger et al.

[11] Patent Number: 5,464,644
[45] Date of Patent: * Nov. 7, 1995

[54] READY-TO-EAT-CEREAL CONTAINING PSYLLIUM AND USE THEREOF FOR LOWERING CHOLESTEROL LEVELS

[75] Inventors: Richard D. Wullschleger, Battle Creek, Mich.; Shirley C. Chen, Tokyo, Japan; Frederick A. Bowman, Augusta; Larry V. Hawblitz, Battle Creek, both of Mich.

[73] Assignee: Kellogg Company, Battle Creek, Mich.

[ * ] Notice: The portion of the term of this patent subsequent to Jul. 13, 2010, has been disclaimed.

[21] Appl. No.: 412,825

[22] Filed: Sep. 27, 1989

[51] Int. Cl.⁶ .................. A23L 1/42; A23L 1/29
[52] U.S. Cl. .................. 426/549; 424/195.1; 424/439; 426/620; 426/621; 426/800; 426/285; 426/618; 426/619; 426/634; 426/804; 426/808
[58] Field of Search .................. 426/285, 618, 426/619, 634, 804, 808, 620, 621, 800, 549; 514/54, 57; 424/195.1, 439

[56] References Cited

U.S. PATENT DOCUMENTS

| | | | |
|---|---|---|---|
| 1,847,247 | 3/1932 | Jones | 424/195.1 |
| 1,891,698 | 12/1932 | Tuvin | 427/214 |
| 2,075,846 | 4/1937 | Halliday | 167/56 |
| 2,278,464 | 4/1942 | Musher | 167/56 |
| 2,999,018 | 9/1961 | Hufman et al. | 99/83 |
| 3,148,114 | 9/1964 | Fahrenbach et al. | 167/55 |
| 3,574,634 | 4/1971 | Singer | 99/83 |
| 3,876,811 | 4/1975 | Bonner et al. | 426/621 |
| 4,028,468 | 6/1977 | Hohner et al. | 426/436 |
| 4,089,981 | 5/1978 | Richardson | 426/104 |
| 4,101,683 | 7/1978 | Kamada et al. | 426/618 |
| 4,143,163 | 3/1979 | Hutchison et al | 426/96 |
| 4,156,021 | 5/1979 | Richardson | 426/104 |
| 4,175,124 | 11/1979 | Hyldon et al. | 424/180 |
| 4,215,149 | 7/1980 | Majlinger | 426/292 |
| 4,235,939 | 11/1980 | Kimberly, Sr. | 426/549 |
| 4,348,379 | 9/1982 | Kowalsky et al. | 424/34 |
| 4,444,761 | 4/1984 | Spiller | 424/180 |
| 4,496,606 | 1/1985 | Michnowski | 426/573 |
| 4,511,561 | 4/1985 | Madaus et al. | 424/195.1 |
| 4,526,799 | 7/1985 | Glicksman et al. | 426/553 |
| 4,551,331 | 11/1985 | Rudin | 424/195.1 |
| 4,565,702 | 1/1986 | Morley et al. | 426/93 |
| 4,568,555 | 2/1986 | Spanier | 426/582 |
| 4,588,589 | 5/1986 | Sheth et al. | 424/195.1 |
| 4,619,831 | 10/1986 | Sharma | 426/93 |
| 4,656,040 | 4/1987 | Fulger et al. | 426/18 |
| 4,666,716 | 5/1987 | Sheth et al. | 424/195.1 |
| 4,668,519 | 5/1987 | Dartey et al. | 426/548 |
| 4,689,229 | 8/1987 | Banik | 424/195.1 |
| 4,698,232 | 10/1987 | Sheu et al. | 426/572 |
| 4,710,386 | 12/1987 | Fulger et al. | 426/28 |
| 4,714,620 | 12/1987 | Bunick et al. | 426/572 |
| 4,737,364 | 4/1988 | Kalogris | 424/195.1 |
| 4,747,881 | 5/1988 | Shaw et al. | 106/209 |
| 4,759,942 | 7/1988 | Von Fulger | 426/621 |
| 4,766,004 | 8/1988 | Moskowitz | 426/658 |
| 4,778,676 | 10/1988 | Yang et al. | 424/79 |
| 4,784,861 | 11/1988 | Gori | 426/74 |
| 4,790,991 | 12/1988 | Shaw et al. | 424/441 |
| 4,861,614 | 8/1989 | Seaborne | 426/621 |
| 4,871,557 | 10/1989 | Linscott | 426/93 |
| 4,877,627 | 10/1989 | Leitz et al. | 426/804 |
| 4,915,960 | 4/1990 | Holmgren | 426/804 |
| 4,950,140 | 8/1990 | Pflaumer et al. | 426/804 |
| 4,961,937 | 10/1990 | Rudel | 426/552 |
| 5,009,916 | 4/1991 | Colliopoulos | 426/615 |
| 5,024,996 | 6/1991 | Ringe | 514/54 |
| 5,026,689 | 6/1991 | Ringe et al. | 514/57 |
| 5,176,936 | 1/1993 | Creighton et al. | 426/618 |
| 5,227,248 | 7/1993 | Wullschleger et al. | 426/549 |

*Primary Examiner*—Ronald W. Griffin
*Attorney, Agent, or Firm*—Felfe & Lynch

[57] ABSTRACT

A ready-to-eat cereal product contains a substantial portion of typical cereal grain component, such as bran, wheat and the like, together with a therapeutic quantity of psyllium. The quantity of psyllium is sufficient to reduce the cholesterol level of humans and animals when part of the diet. The psyllium may be added as an intermediate psyllium product prepared by directly expanding psyllium husks, either by itself or together with minor amounts of other ingredients. The psyllium intermediate is preferably added during the process for making the final cereal product after the typical cereal grain components have been totally or partially cooked.

15 Claims, 3 Drawing Sheets

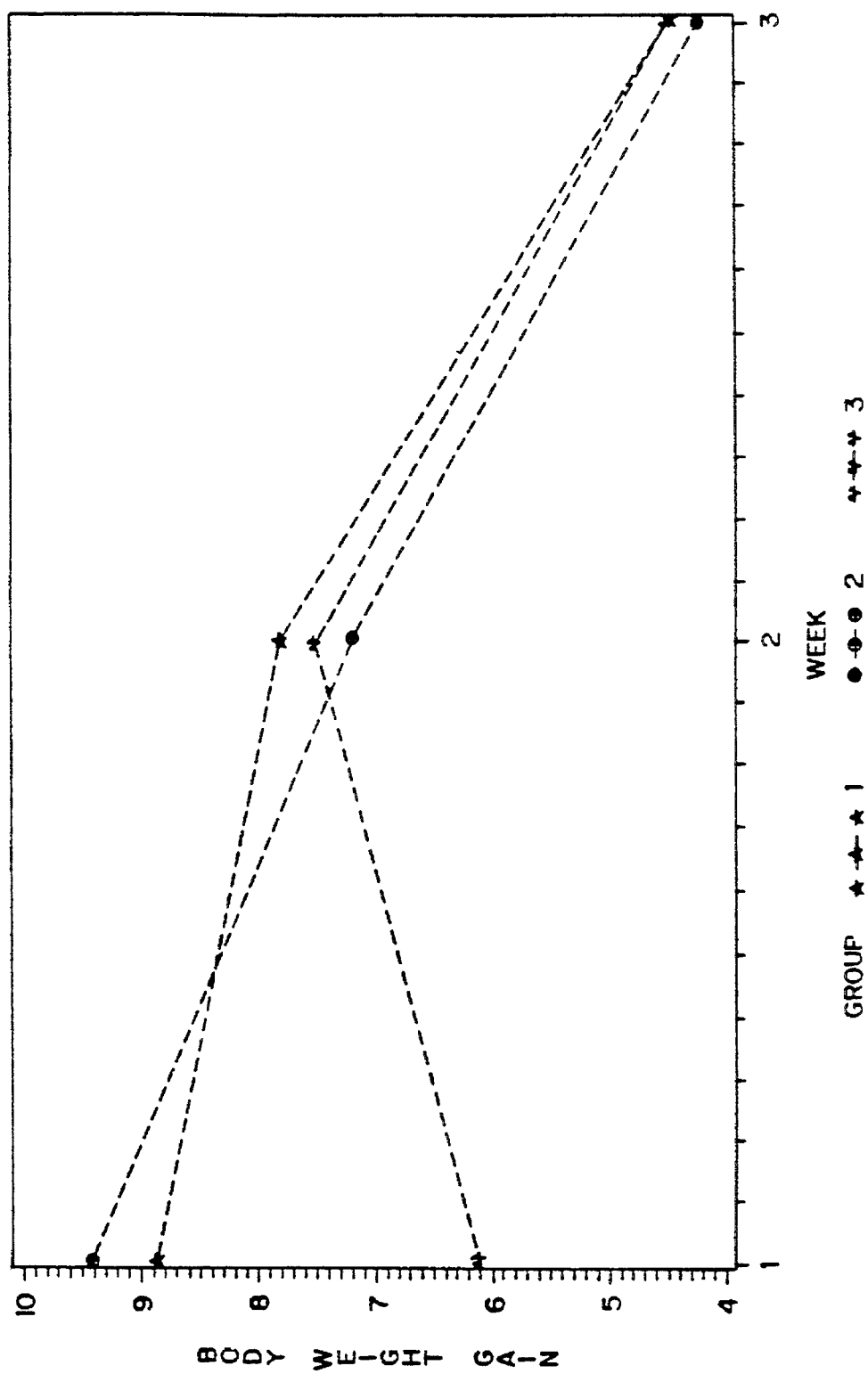

READY-TO-EAT-CEREAL CONTAINING PSYLLIUM AND USE THEREOF FOR LOWERING CHOLESTEROL LEVELS

TECHNICAL FIELD

The present invention relates to a novel ready-to-eat cereal food product containing a therapeutic quantity of psyllium and to a process for producing same. In addition, the invention involves a novel extruded psyllium product particularly useful as an intermediate in the production of ready-to-eat psyllium-containing cereals and other foodstuffs.

BACKGROUND ART

Psyllium is a known mucilaginous material which has found extensive use in bulk laxatives. The source of psyllium is the seeds from the plants of the Plantago genus, which grows in certain sub-tropical regions. The seeds are dark brown, smooth, boat-shaped and shiny. Since it is believed by those skilled in the art that the active ingredient of psyllium is the psyllium seed gum, which is located primarily in the seed husk, present technology uses the ground seed husk as the source for psyllium. However, the whole seed is also known as a psyllium source, as well as the dehusked psyllium seed.

Due to the mucilaginous nature of psyllium, however, psyllium acquires a slimy or adhesive texture and mouthfeel upon hydration. This slimy mouthfeel is unpalatable and, accordingly, various additives have been incorporated in psyllium-containing ingestible compositions in order to mask the undesirable texture and mouthfeel of the psyllium. In addition, psyllium develops a distinctive, undesirable flavor in the presence of heat and moisture which further limits its use in food products.

Notwithstanding the undesirable flavor and texture imparted to an ingestible composition by psyllium or psyllium husks, various psyllium-containing foodstuffs have been proposed which purport to take advantage of the natural digestion regulation properties of psyllium, or the satiating or "fullness-feeling" effect of psyllium. See, for example, U.S. Pat. Nos. 3,574,634 and 4,348,379.

In addition, it has been suggested, for example in U.S. Pat. No. 3,148,114, that whole psyllium husks, such as the ground husks of the seed of *Plantago psyllium*, lowers blood cholesterol upon oral administration thereof. Further, it has also long been known to use small quantities of psyllium, such as less than 1%, as a thickener in foodstuffs, such as in ice cream, puddings and the like.

Finally, U.S. Pat. No. 4,849,222 discloses a medicament composition for reducing blood cholesterol levels in humans and lower animals which comprises a mixture of psyllium seed gum, or source of psyllium seed gum, and a nonabsorbable, nondigestible polyol polyester.

However, as set forth above, the mucilaginous nature of psyllium husks presents grave processing difficulties, and prior attempts to produce a palatable, ready-to-eat food product containing psyllium have not resulted in a satisfactory product to date, particularly, with respect to flavor and texture or mouthfeel.

It is therefore the principal object of the present invention to provide a ready-to-eat breakfast cereal containing a significant quantity of psyllium which has good textural and flavor characteristics, particularly mouthfeel.

Another object of the present invention is to provide a psyllium-containing ready-to-eat cereal which avoids the organoleptic drawbacks previously associated with all psyllium-containing foodstuffs.

A further object of the present invention is to provide a psyllium-containing cereal which is effective in reducing serum and/or liver cholesterol levels in animals and humans.

In addition, it is an object of the present invention to provide a cereal product in which all the healthful characteristics associated with ingesting raw psyllium are retained with the final product exhibiting good organoleptic qualities.

Still another object of the present invention is to provide an extruded psyllium-containing product useful as an intermediate or additive in a process for producing a psyllium-containing food product.

Yet another object of the present invention is to provide an economic process for producing a psyllium-containing cereal having good textural and flavor characteristics, which utilizes standard type equipment employed in the ready-to-eat cereal making art.

Additional objects and advantages of the present invention will become apparent from the following detailed description and examples thereof.

SUMMARY OF THE INVENTION

The present invention relates to a novel breakfast cereal which contains a quantity of psyllium sufficient to provide a hypocholesterolemic effect if ingested by humans and lower animals (hereinafter generically "animals"). The source for the psyllium in the present invention can be psyllium seed husk, whole psyllium seed or dehusked psyllium seed. When so ingested, the psyllium-containing cereal effectively reduces the animal serum and/or liver cholesterol levels. In addition, other therapeutic benefits from psyllium can be achieved by such cereal product, including lowered glycemic index and laxative effectiveness.

The psyllium concentration in the finished cereal product should be at least 2% by dry weight basis and probably no more than 25–30% by dry weight basis. Preferably, the psyllium concentration should be 6–19%, and about 11–14% appears most desirable. All of the weight percentages set forth herein are on a dry basis, whether or not so stated. It has been found that a ready-to-eat cereal containing psyllium within these ranges can be made which has good flavor and textural characteristics and does not exhibit the slimy mouthfeel typical of prior psyllium-containing ingestible compositions.

The psyllium-containing cereal of the present invention can take the form of any conventional ready-to-eat cereal, such as flakes, biscuits and other shred products, puffed products, morsels, and other conventional cereal piece shapes.

The present invention also involves a novel process for producing the psyllium-containing cereal. Psyllium develops flavor in the presence of heat and moisture like cereal grains. The flavor developed through conventional processing of psyllium, however, is not acceptable in a food product. Further, psyllium contains a gum. Gums develop a slimy texture on hydration which occurs during conventional cereal processing. Accordingly, product formulations and processing procedures are designed to develop the flavors and texture attributes found in other cereal products, while avoiding or minimizing the undesirable flavor and textural characteristics of processed psyllium.

Therefore, according to a preferred form of the present invention, a novel psyllium-containing intermediate product or additive is produced, which can then be added to typical bulk cereal starting material or materials after the starting material has been totally or partially cooked. The psyllium intermediate and the cooked cereal product or products are then processed into the finished psyllium-containing cereal of the present invention. This novel psyllium-containing intermediate product is preferably formed by directly expanding psyllium husks into nuggets with or without other minor ingredients such as used in the cereal art, including oat bran, wheat bran, any starch source (like rice flour and corn flour), sucrose, soy fiber, pectin, salt and other flavoring ingredients. The quantity of psyllium in the nugget intermediate product should preferably be at least 75%, but can be substantially lower depending upon the proportion of intermediate product which is to be added and the type of cooked cereal used.

When the novel psyllium nuggets are physically blended with a cooked bulk cereal ingredient, and then the resultant blended mixture is formed into shaped cereal pieces, a high degree of cholesterol reduction is achieved by ingesting the cereal product. A wide variety of bulk cereal ingredients can be combined with the intermediate psyllium nuggets in accordance with the present invention. These cereal ingredients include whole grains such as whole wheat, rice, oats, barley, corn and rye, grain components such as wheat germ and brans including oat bran, wheat bran, etc., flours such as wheat flour, corn flour, etc., legumes such as soybeans, peas, beans and the like, and non-bran fiber sources such as prune fiber, guar, beet fiber, and citrus pulp, and other novel raw material ingredients.

In addition, it is believed that similar hypocholesterolemic effectiveness can be achieved for other foodstuffs, without the organoleptic disadvantages associated with psyllium, by preparing such foodstuffs with a sufficient quantity of the intermediate psyllium nugget product of the present invention. Such foodstuffs can include non-cereal products such as cookies, cereal bars, waffles and the like, dried fruit pieces and fruit fillings.

BRIEF DESCRIPTION OF THE DRAWINGS

FIGS. 1, 2 and 3 are graphs depicting weekly food efficiency ratios (FIG. 1), weekly food intake (FIG. 2) and weekly body gain (FIG. 3) with respect to hamsters fed controlled diets to demonstrates the method for lowering blood cholesterol of the present invention.

DETAILED DESCRIPTION OF THE INVENTION

Figure 1:
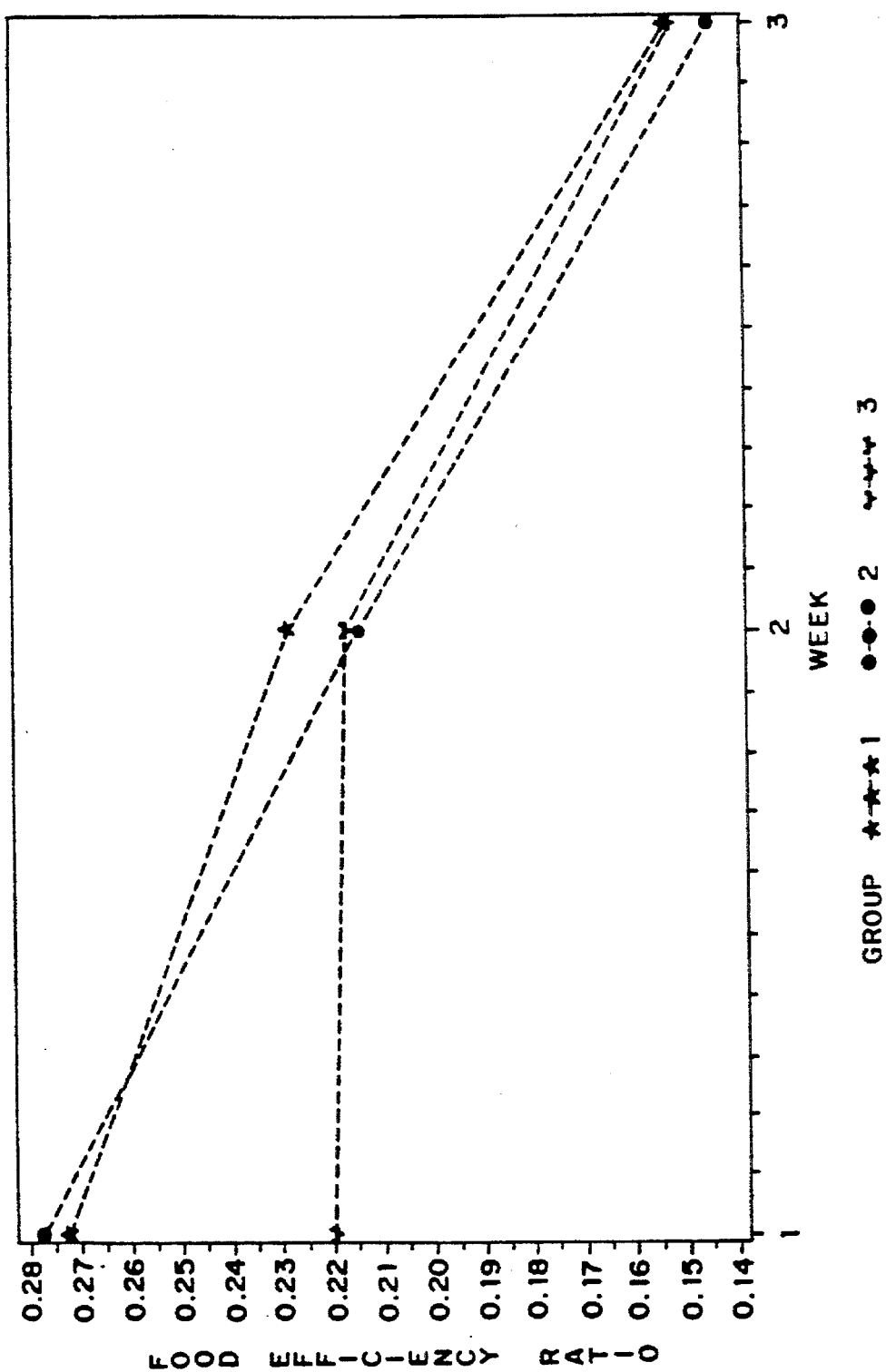

The ready-to-eat psyllium-containing cereal of the present invention may be produced in one of many ways, depending upon the desired final shape of the ready-to-eat cereal pieces and the production steps and equipment to be used. For example, the production of biscuits, morsels puffed products, and flakes all , require different process steps and equipment.

A psyllium-containing ready-to-eat cereal in the form of extruded morsels can be produced as follows. The starting bulk ingredients are blended together with a psyllium starting material. An appropriate psyllium starting material is sterilized raw psyllium husks. Sterilization of psyllium husks can be accomplished by known sterilization procedures. A small amount of citric acid, on the order of 1.5% by weight, may be used as an additive to the sterilized psyllium.

Typical bulk starting ingredients for the extruded morsel product are set forth in Table 1 below.

TABLE 1

| Ingredient | % Finished Product Dry Basis Wt. |
| --- | --- |
| Wheat bran | 25–75 |
| Sugar | 5–30 |
| Psyllium husks | 2–30 |
| Corn bran | 0–15 |

Other known bulk cereal ingredients can be substituted for the wheat bran and corn bran specified. The other ingredients include whole grains such as whole wheat, rice, oats, barley, corn and rye, grain components such as wheat germ and brans including oat bran, wheat bran, etc., flours such as wheat flour, corn flour, etc., legumes such as soybeans, peas, beans and the like, and non-bran fiber sources such as prune fiber, guar, beet fiber, and citrus pulp, and other novel raw material ingredients. The psyllium component is preferably in the range of about 6–19% and most preferably 11–14%.

The mixed bulk ingredients are conveyed to an extruder as a blended mixture where the mixture is cooked and then extruded into shaped pieces having the desired final morsels shape of the cereal product. The extruded shaped pieces are conveyed to and through a drier and then conveyed through cooling equipment and finally packaged as a finished product. During this processing, additional minor ingredients and fortifying additives are added in a conventional manner. Those flavor ingredients and fortifying additives can be varied depending upon the desired characteristics of the final cereal product and are well known in the art. With the exception of adding the psyllium husks to the bulk starting ingredients, the procedures for making psyllium-containing morsels follow conventional cereal bran processing techniques.

The preferred psyllium-containing ready-to-eat bran cereal in the form of extruded morsels, in accordance with the present invention, exhibits good color, flavor, appearance and texture without the typically undesirable flavor and mouthfeel of psyllium. In taste panel testing, the psyllium-containing morsels cereal product of the present invention was rated acceptable.

In an alternate and preferred form of the present invention, the psyllium starting material is first separately processed into an intermediate product which can be added to cereal grain or grains after cooking. By separately processing the psyllium into an intermediate product and then adding that product to the bulk cereal grain ingredient or ingredients after cooking or partial cooking, the unpleasant taste, texture and mouthfeel characteristics of psyllium are suppressed while the desired healthful characteristics of the psyllium are still retained in the final cereal product.

This intermediate psyllium-containing product can be produced as follows. Sterilized psyllium husks, which may or may not have been treated with citric acid in a known amount, e.g., about 1.5% by weight, are mixed and blended with oat bran, rice flour and sucrose. Preferably, these ingredients are mixed in the amounts set forth in Table 2 below.

TABLE 2

| | % finished product dry basis wt. |
| --- | --- |
| Psyllium husks | 50–100% |
| Oat bran | 0–50 |

TABLE 2-continued

|  | % finished product dry basis wt. |
|---|---|
| Sucrose | 0–25 |
| Rice flour | 0–25 |

The type and quantity of the other ingredients which can be combined with psyllium in formulating the intermediate product can be varied greatly. Examples of other ingredients include wheat bran, other starch sources such as corn flour, soy fiber, pectin, salt and other flavoring ingredients. An especially preferred mixture is 75% by dry weight psyllium husks with citric acid, 15% dry weight oat bran, 5% by dry weight sucrose, and 5% by dry weight rice flour.

The blended mixture is introduced into a food extruder where the mixture is directly expanded to produce an extruded nugget product. The extruded nuggets are then cooled and subsequently dried to a moisture content of less than 12% by weight. Preferably, the cooled extruded product is dried to a moisture content of approximately 2–8% by weight, and most desirably to about 3–5% by weight.

The preferred psyllium-containing intermediate nugget product of the present invention has a dull, opaque beige cast over a dull medium brown base color. The nuggets have a dense, very hard, glassy, and brittle texture, in a round to slightly oval shape, generally about the size of a bebe, approximately ⅛–¼ inch in diameter. The nuggets have a rough, irregular surface with some air pockets, located either in the interior or broken open on the surface. The nuggets exhibit a strong, characteristic psyllium odor and flavor.

Psyllium-containing ready-to-eat cereal flakes can be produced using the intermediate nuggets in accordance with the following procedure. The bulk ingredient of the cereal, for example, wheat bran or a mixture of wheat bran and oat bran, is cooked in a standard rotary cooker. The intermediate psyllium-containing product, produced as described above, is then added to the cooked bran, and the resultant mixture is blended.

A typical blend of the resultant mixture is set forth below in Table 3.

TABLE 3

|  | % finished product dry basis wt. |
|---|---|
| Wheat bran | 25–75% |
| Oat bran | 5–30 |
| Nuggets (75% psyllium) | 3–40 |
| Sugar | 5–30 |

Other proportions and types of bulk cereal ingredients known to the art in the manufacture of cereal flakes can be used in formulating the resultant mixture with the psyllium-containing nuggets. The proportion of wheat bran and oat bran components can be varied widely and known cereal flake ingredients can be readily substituted. For example, standard cereal ingredients may be substituted including whole grains such as whole wheat, rice, oats, barley, corn and rye, grain components such as wheat germ and brans including oat bran, wheat bran, etc., flours such as wheat flour, corn flour, etc., legumes such as soybeans, peas, beans and the like, and non-bran fiber sources such as prune fiber, guar, beet fiber, and citrus pulp, and other novel raw material ingredients.

Preferably, 10–20% by dry weight of the blended mixture is the intermediate nuggets, containing at least 75% by dry weight psyllium. More or less can be used depending upon the concentration of psyllium in the intermediate product and the desired psyllium concentration for the final product. It has been found that a desirable addition of the psyllium nuggets is on the order of 15–16% by dry weight, if the psyllium concentration of the nuggets is the preferred 75%.

Following blending, the mixture is pelletized, dried and tempered under conditions which do not lead to the development of undesirable psyllium flavor or texture. The pellets are then flaked, toasted and passed to a coating zone to produce a psyllium-containing ready-to-eat cereal in the form of flakes. The steps of this process, after the addition and blending of the psyllium nuggets with the cooked bran ingredients, follow conventional cereal-making techniques.

A particularly preferred psyllium-containing ready-to-eat cereal is bran flakes with psyllium, having the composition by weight shown in Table 4 below.

TABLE 4

|  | % Dry basis wt. |
|---|---|
| Bulk ingredients |  |
| Heavy wheat bran | 50.41 |
| Oat bran | 12.20 |
| Sugar | 8.13 |
| Beet fiber | 2.44 |
| Prune powder | 2.42 |
| Rice flour | 2.11 |
| HFCS (High fructose corn syrup) | 1.63 |
| Salt | 0.89 |
| Barley malt syrup | 0.81 |
| Agar Gum | 0.09 |
| Calcium carbonate | 0.08 |
| Trisodium phosphate | 0.05 |
| Carmel color | 0.04 |
| Psyllium-containing additive @ 15.5%: |  |
| 75% Psyllium | 11.63 |
| 15% Oat bran | 2.33 |
| 5% Sucrose | 0.78 |
| 5% Rice flour | 0.78 |
| Coating @ 3.2%: |  |
| Sucrose | 2.00 |
| Honey | 1.00 |
| Salt | 0.20 |
|  | 100.02 |

The above bran flakes exhibit the good color, flavor, appearance and texture typical of similar bran flakes made without the addition of the psyllium nuggets, and the flakes exhibit none of the undesirable flavor and mouthfeel characteristics of psyllium. In taste panel testing of the psyllium-containing bran flakes of Table 4, the cereal product of the present invention was rated acceptable.

The invention is further illustrated but not limited by the following examples.

EXAMPLE 1

A psyllium containing ready-to-eat cereal in the form of extruded morsels was produced having a final composition on a dry weight basis as set forth in Table 5 below.

TABLE 5

| Ingredient | Percent Dry Basis |
|---|---|
| Wheat Bran | 49.9 |
| Sugar | 23.1 |
| Psyllium Husk no Citric Acid | 13.0 |

TABLE 5-continued

| Ingredient | Percent Dry Basis |
| --- | --- |
| Corn Bran | 8.9 |
| High Fructose Corn Syrup [HFCS] | 3.1 |
| Salt | 1.6 |
| Sodium Bicarbonate | 0.25000 |
| Vitamin C | 0.05959 |
| Vitamin A & D conc. with BHT | 0.02273 |
| Annatto | 0.02000 |
| Vitamin B3 | 0.01818 |
| Zinc Oxide | 0.01705 |
| Iron | 0.01636 |
| Vitamin B6 | 0.00233 |
| Vitamin B2 | 0.00155 |
| Vitamin B1 | 0.00136 |
| Folic Acid | 0.00036 |
| | 100.00951 |

The extruded morsels were prepared in the following fashion. All of the ingredients except HFCS, Vitamins A & D and Vitamin C were first mixed. The mixture was then cooked and extruded into pieces, while HFCS was injected into the ingredients mixture. The food exit temperature was 350°–400° F., and the moisture content after cooling was 5%. The extruded pieces were then toasted and vitamins A & D and vitamin C were sprayed thereon. The product finished with a food moisture of 3%. In taste panel testing, the product was rated acceptable.

EXAMPLE 2

Psyllium-containing intermediate nuggets were prepared having a final composition on a dry weight basis as set forth in Table 6 below.

TABLE 6

| Ingredient | Percent Dry Basis |
| --- | --- |
| Psyllium Husks with 1.5% Citric Acid | 75.0 |
| Oat Bran | 15.0 |
| Rice Flour | 5.0 |
| Sucrose | 5.0 |
| | 100.0 |

The psyllium husks had been sterilized by extrusion. All of the ingredients were first mixed and then directly expanded using an extruder. The product exit temperature from the extruder was 190° F and the moisture content after cooling was 31%. The product was then dried for 30 minutes at 210° F. to a moisture content of 3%.

EXAMPLE 3

The bran flake ready-to-eat cereal set forth in Table 4 was prepared in the following manner. The bulk dry ingredients were first mixed and then the flavoring ingredients sugar, salt, color, HFCS, and malt syrup, which had previously been diluted with warm water, were added in a rotating cooker. The bulk ingredients were then cooked for 65 minutes at 17 psi. Thereafter, the psyllium-containing intermediate nuggets having the composition set forth in Table 4, and prepared in accordance with the procedure described in Example 2, were blended with the bran cook in a mixer. The blended mixture was then milled with a Fitz mill and pelletized, and the pellets dried to a moisture content of 20%. The product was then tempered hot for 30 minutes, flaked and toasted at 370° F. The finished flakes had a food moisture content of 3%. The product had a crispy texture, desirable appearance and acceptable flavor.

EXAMPLE 4

Another bran flake ready-to-eat cereal enriched with psyllium was prepared having a final composition on a dry weight basis as set forth in Table 7 below.

TABLE 7

| Ingredients | Percent Dry Basis |
| --- | --- |
| Bran Cook at 80.15%: | |
| Whole Wheat, Chopped | 44.71 |
| Oat Bran | 11.98 |
| Sugar | 8.27 |
| Wheat Bran | 7.19 |
| Prune Powder | 2.33 |
| Rice Flour | 2.08 |
| High fructose Corn Syrup | 1.60 |
| Salt | 0.88 |
| Barley Malt Syrup | 0.80 |
| Guar Gum | 0.09 |
| Calcium Carbonate | 0.08 |
| Trisodium Phosphate | 0.05 |
| Caramel Color | 0.04 |
| Vitamin B3 | 0.01828 |
| Iron, Reduced | 0.01645 |
| Zinc Oxide | 0.00685 |
| Vitamin B2 | 0.00155 |
| Folic Acid | 0.00037 |
| Psyllium Nuggets at 16.65%: | |
| 75% Psyllium Husk with 1.5% Citric Acid | 12.50 |
| 15% Oat Bran | 2.50 |
| 5% Sucrose | 0.82 |
| 5% Rice Flour | 0.82 |
| <0.1% Annatto Color | 0.0083 |
| Coating at 3.2%: | |
| Sucrose | 3.00 |
| Salt | 0.20 |
| Vitamin Spray: | |
| Vitamin A & D conc., 3% BHT | 0.02285 |
| Vitamin B6 | 0.00234 |
| Vitamin B1 | 0.00137 |
| Vitamin B12 | 0.00055 |
| | 100 |

The bulk brancook dry ingredients were first mixed. The flavoring ingredients comprising sugar, salt, color, HFCS and malt syrup (previously diluted with warm water) were then added to and mixed with the bulk ingredients in a rotating cooker. The bulk ingredients were cooked for 65 minutes at 17 psi, cooled and screen separated. Thereafter, psyllium-containing intermediate nuggets having a composition as set forth in Table 7 above, and prepared in accordance with the procedure described in Example 2, were blended with the bran, and the mixture cooked to completion in a mixer. The mixture was then milled, pelletized, and the pellets dried to a moisture content of about 20%. The product was tempered hot for 30 minutes, flaked and toasted at 370° F. The flakes were then sprayed with the coating composition together with Vitamins A & D, B6, B12 and B1. The finished flakes had a food moisture content of about 3%. The product had a crispy texture, desirable appearance and acceptable flavor.

EXAMPLE 5

A psyllium-containing ready-to-eat bran cereal in the form of biscuits was prepared having a final composition on a dry weight basis as set forth in Table 8 below.

TABLE 8

| Ingredient | Percent Dry Basis |
| --- | --- |
| Heavy Bran, Wheat | 62.3 |
| Light Bran, Wheat | 26.2 |
| Sucrose | 3.9 |
| High Fructose Corn Syrup | 2.4 |
| Psyllium Seed Husk | 2.0 |
| Salt | 1.7 |
| Malt Syrup | 1.5 |
| Iron | 0.02946 |
| Zinc Oxide | 0.03068 |
| Vitamin B3 | 0.01818 |
| Vitamin B2 | 0.00155 |
| Folic Acid | 0.00036 |
|  | 100.08023 |

The sucrose, HFCS, salt, malt syrup, vitamins and minerals were mixed with water to make flavor and deliver a 29% moisture content to the cooker. The flavor ingredients were then mixed with the heavy bran and tempered for 15 minutes. The light bran and psyllium seed husks were then added and the mixture cooked. The cooked product was cooled, separated and dried briefly, after which it was tempered warm for 30 minutes. The product was then shredded into biscuit shapes and toasted in a conventional oven. The resultant product was a biscuit shaped ready-to-eat cereal having an acceptable flavor, texture and appearance.

EXAMPLE 6

Another psyllium-containing intermediate nugget product was prepared having a final composition on a dry weight basis set forth in Table 9 below.

TABLE 9

| Ingredient | Percent Dry Basis |
| --- | --- |
| Psyllium Seed Husk | 50.0 |
| Wheat Bran | 30.0 |
| Sucrose | 10.0 |
| Rice Flour | 10.0 |
|  | 100.0 |

All of the ingredients were mixed and then directly expanded using an extruder. The product was dried for 30 minutes at 200° F to a 3% moisture content.

EXAMPLE 7

Yet another psyllium-containing intermediate nugget product was prepared having a final composition on a dry weight basis set forth in Table 10 below.

TABLE 10

| Ingredient | Percent Dry Basis |
| --- | --- |
| Psyllium Seed Husk | 75.0 |
| Wheat Bran | 15.0 |
| Sucrose | 5.0 |
| Rice Flour | 5.0 |
|  | 100.0 |

The ingredients were mixed and directly expanded using an extruder. The flour mix was added at the rate of 1.8 lbs per minute together with water at the rate of 0.6 lbs per minute. The die pressure was 1300 lbs/square inch and the temperature of zone 1 was 127° F. and zone 2, 260° F. The extruded product was then dried for 30 minutes at 200° F. to 3% moisture content.

EXAMPLE 8

A psyllium-containing bran flake ready-to-eat cereal was prepared using cooked bran bulk ingredients from standard Kellogg 40% bran flake formula and process. The cooked bran bulk ingredients were mixed with psyllium nuggets of Example 6 in the proportion of 76% cooked bulk bran ingredients and 24% psyllium nuggets, by dry weight basis. The ingredients were mixed for 3 minutes after which they were pelletized and dried for 5 minutes at 200° F. The product was tempered hot for 60 minutes, flaked and then toasted.

EXAMPLE 9

A wheat biscuit ready-to-eat cereal enriched with psyllium was prepared in the following manner. Seventy-one parts by dry weight soft white winter wheat was cooked and then chopped. The chopped wheat was mixed thoroughly with 24 parts by dry weight psyllium nuggets prepared in accordance with Example 6. Water was added to adjust the mixture to a moisture content of about 40%. The mixture was then tempered for 30 minutes, and processed through a shred mill. Five parts by dry weight brown sugar were added to the shreds, which were then cut into a biscuit shape, and toasted. The product processed well and was deemed acceptable for flavor, appearance and color, and especially liked for texture.

EXAMPLE 10

Cinnamon cookies enriched using a psyllium-containing intermediate nugget product were prepared using the ingredients set forth in Table 11 below, with each composition on an as is percent basis.

TABLE 11

| Ingredients | Percent As Is |
| --- | --- |
| Cinnamon | 1.5 |
| Shortening | 13.0 |
| Lecithin | 0.2 |
| Vanilla Extract, 2× | 0.4 |
| Salt | 0.3 |
| Baking Soda | 0.25 |
| Baking Powder | 0.1 |
| Ammonium Bicarbonate | 0.25 |
| Sugar | 18.0 |
| Psyllium Nuggets | 22.0 |
| Almonds, Diced | 10.0 |
| Wheat Flour | 25.0 |
| Water | 9.0 |
|  | 100.0 |

The psyllium nuggets were prepared in accordance with Example 6 above except the psyllium seed husks contained no citric acid. The cinnamon, shortening and lecithin were mixed first for two minutes at high speed in a dough mixer. All the remaining ingredients (except water) were then added and mixed for two minutes at low speed. The psyllium nuggets were prepared in accordance with Example 6. The water was then added and the product mixed two more minutes at low speed. The dough was then separated into cookies and baked at 340° F. for about 11 ½ minutes. The product had a desirable crispy texture, good flavor and satisfactory appearance.

EXAMPLE 11

Another psyllium-containing bran flake ready-to-eat cereal was prepared using cooked bran ingredients from standard Kellogg 40% bran flake formula and process. Eighty parts by dry weight of the cooked bran bulk ingredients were mixed with 20 parts by dry weight psyllium seed husks for one minute. Water was added to adjust the moisture content up to 32.2% and the mixing continued for an additional two minutes. The mixture was pelletized, dried for six minutes at 200° F., and tempered hot for one hour The tempered product was then separated, flaked and toasted.

EXAMPLE 12

A ready-to-eat rice flaked cereal containing psyllium was prepared in the following manner. Seventy parts by dry basis weight cooked rice, prepared in a conventional manner, was dried to a moisture content of about 12%. Twenty parts by dry weight psyllium seed husk and 10 parts by dry weight sucrose were separately mixed together. Thereafter, the cooked rice was added to the mixed ingredients and thoroughly mixed with water added to a moisture content of about 24%. The mixture was then extruded and cut into pellets, which were then dried and cooled. The pellets were then flaked and dried in a conventional manner, then toasted.

The following tests demonstrate the hypocholesterolemic effect of the intermediate psyllium-containing product per se and the hypocholesterolemic effect of psyllium-containing ready-to-eat cereals of the present invention.

EXAMPLE 13

A psyllium-containing cereal of the present invention was compared with cellulose and wheat bran controls to determine the hypocholesterolemic effect of the psyllium-containing cereal. The psyllium-containing cereal was psyllium bran flakes having the composition, and having been prepared in accordance with the procedures, described in Example 11. The cellulose and the wheat bran control diets were prepared exactly in the manner of the psyllium bran flakes diet.

Golden Syrian hamsters were divided into three groups, each group having a total of 14 hamsters, all male. All of the hamsters were fed an acclimatization diet procedure as follows: (1) Purina chow for 2 days, (2) a 50/50 mixture of Purina chow and wheat bran diet for 3 days, (3) a 25/75 mixture of Purina chow and wheat bran diet for 3 days. Afterwards, they were assigned according to their body weights to one of the treatments by a randomized block design. One group was fed the cellulose-based diet, another group was fed the wheat bran-based diet, and the final group was fed a diet based on the psyllium-containing ready-to-eat cereal of Example 11. The compositions of the three diets were as shown in Table 12, with all amounts expressed as parts by weight. All diets had at least 5% safflower oil to ensure sufficient supply of essential fatty acids. Levels of all nutrients were balanced for all diets. The same nutrient/energy ratio was maintained for each nutrient in all diets. To compensate for the vitamins and minerals in Bran Flakes, additional vitamins and minerals as indicated in Table 12 were incorporated into the diets.

TABLE 12

| | Diet 1 Cellulose | Diet 2 Wheat Bran[1] | Diet 3 Psyllium-Bran Flakes[2] |
|---|---|---|---|
| Test material | 0 | 25.4 | 33.1 |
| Casein (89%) | 22.4 | 17.62 | 18.38 |
| DL-methionine | 0.2 | 0.15 | 0.15 |
| L-lysine | 0 | 0.1 | 0.1 |
| Beef tallow | 7 | 7 | 7 |
| Safflower oil | 5 | 3.65 | 4.54 |
| Coconut oil | 2 | 2 | 2 |
| Starch | 32.08 | 26.85 | 18.84 |
| Sugar | 15 | 15 | 11.36 |
| Cellulose[3] | 10 | 0 | 0 |
| AIN-76 vitamin mix | 1.2 | 1.2 | 1.2 |
| AIN mineral mix (NaCl free) TD 86126 | 4 | 4 | 4 |
| Choline chloride | 0.5 | 0.5 | 0.5 |
| Cholesterol | 0.125 | 0.125 | 0.125 |
| NaCl | 0.5 | 0.5 | 0 |
| Total parts | 100.01 | 104.10 | 101.30 |
| Additives[4] (mg): | | | |
| Riboflavin | 0.4 | 0.3 | 0 |
| Niacin | 6.8 | 0 | 2.2 |
| Folic acid | 0.1 | 0.1 | 0 |
| Fe citrate (16–17% Fe) | 12.4 | 0 | 2.9 |
| $ZnCO_3$ (70% ZnO) | 6.7 | 3.1 | 0 |
| K-citrate-$H_2O$ ($K_3C_6H_5O_7H_2O$) | 2565.4 | 0 | 1565.0 |
| $K_2SO_4$ | 202.0 | 0 | 123.2 |

[1]Wheat bran has the composition shown in Table 13 below.
[2]Psyllium-bran flakes has the composition shown in Table 13 below.
[3]The cellulose was Solka Floc having a particle size less than 0.35 microns.
[4]The actual amounts of elemental mineral added were: Cellulose - 2.1 mg Fe, 3.5 mg Zn and 400.0 mg K; Wheat bran - 1.6 mg Zn; and Psyllium-bran flakes - 0.5 mg Fe and 244.0 mg K.

TABLE 13

| | Composition per 100 g | |
|---|---|---|
| | Wheat bran (AACC) | Psyllium-Bran Flakes |
| Water, g | 9.54 | 2.65 |
| Ash, g | 6.10 | 3.80 |
| Fat, g | 5.33 | 1.40 |
| Protein, g | 16.99 | 11.95 |
| TDF[1], g | 39.4 | 30.2 |
| NDF[2], g | | 14.3 |
| Sugars, g | | 11.0 |
| Starch, g | 20.6 | 40.0 |
| Sodium, mg | 16.0 | 604.0 |

[1]Total Dietary Fiber
[2]Neutral-detergent Fiber
[3]Calculated by difference

Figure 2:
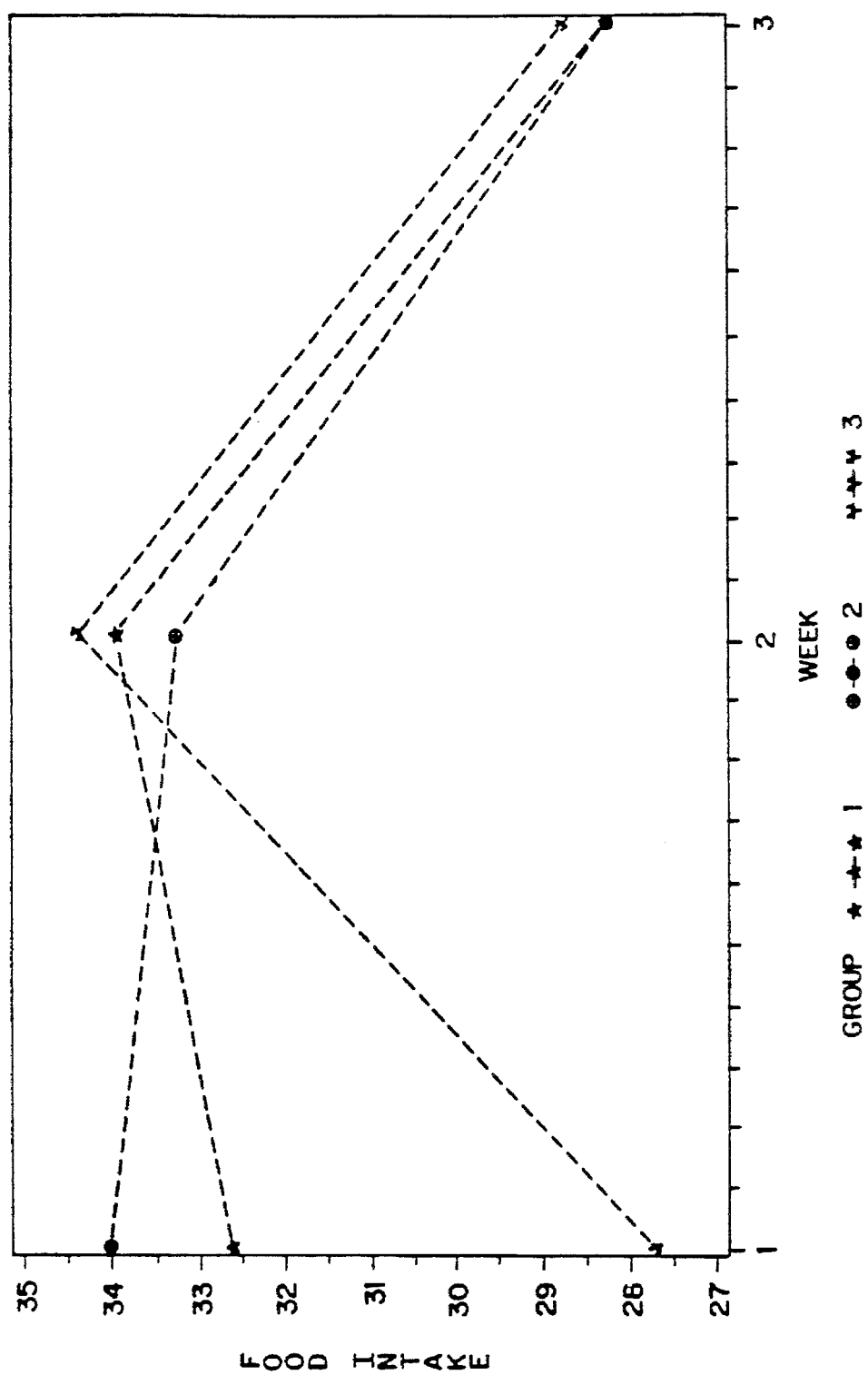

Three-week food efficiency rations, food intakes, and total body weight gains of the 3 groups of hamsters were not different. For those animals assigned to diets other than the wheat bran control (diets 1 and 3), the switch from the acclimatization-diet to the experimental diet required some adaptation to the change in the texture and taste of the diet. Those assigned to the psyllium-BF based diet (diet 3) were likely to have experienced a greater change in food intake (see FIG. 2), reflected in body weight gain (FIG. 3) and feed efficiency ratio (FIG. 1) than those assigned to the cellulose control diet (diet 1) because of the significant difference in texture and taste of the cereal prototype from cellulose and wheat bran. This is reflected in the lower weight gains and food intakes of animals fed diets 1 and 3; and more so for diet 3 fed animals initially at the first week. At the beginning of the second week Diets 1 and 3 fed animals had caught up in food intake and weight gain with animals fed the control wheat bran diet. The weekly feed efficiency, food intake, and body weight gain data are shown in FIGS. 1, 2 and 3 below.

Serum lipid levels of the three groups of hamsters were measured after 3 weeks of being fed the cellulose, wheat bran or psyllium-bran flakes diet. The results are shown in Table 14 below.

TABLE 14

| | Serum lipid levels (mean +/– SD) | | |
|---|---|---|---|
| | DIET | | |
| | Cellulose | Wheat Bran | Psullium-Bran Flakes |
| TG[1], mg/dl | 154 +/– 60 | 153 +/– 71 | 114 +/– 41 |
| TC[2], mg/dl | 240 +/– 22 | 236 +/– 18 | 133 +/– 17 |
| HDLC[3], mg/dl | 171 +/– 17 | 159 +/– 17 | 91 +/– 11 |
| HDLC/TC, % | 71 +/– 5 | 68 +/– 8 | 70 +/– 7 |

[1]Triglycerides
[2]Total cholesterol
[3]High density lipoprotein cholesterol

These results shown in Table 14 demonstrate the dramatic hypocholesterolemic effect achieved by a diet containing the psyllium-containing cereal of the present invention.

The liver lipid levels of the three groups of hamsters were also measured after 3 weeks of being fed the cellulose, wheat bran or psyllium-bran flakes diet. The results are shown below in Table 15.

TABLE 15

| | Liver lipid levels (mg/g, mean +/– SD) | | |
|---|---|---|---|
| | DIET | | |
| | Cellulose | Wheat Bran | Psullium-Bran Flakes |
| Free Cholesterol | 1.9 +/– 0.2 | 1.7 +/– 0.3 | 1.6 +/– 0.3 |
| Cholesteryl Esters | 12.5 +/– 2.4 | 10.6 +/– 3.0 | 1.4 +/– 0.9 |
| Triglycerides | 3.3 +/– 1.1 | 2.2 +/– 0.7 | 4.4 +/– 3.0 |
| Phospholipids | 17.6 +/– 2.1 | 16.2 +/– 3.6 | 16.7 +/– 3.8 |
| Total Lipids | 45.8 +/– 6.1 | 39.6 +/– 9.0 | 27.8 +/– 6.4 |

The results shown in Table 15 demonstrate the significant reduction in liver lipid levels achieved through a diet of the psyllium-containing cereal of the present invention.

EXAMPLE 14

A second hamster study was conducted to determine the hypocholesterolemic efficacy of the psyllium-containing bran flakes produced in accordance with Example 11 above, in a dose response trial. At the same time, a rice flaked ready-to-eat cereal product, containing a therapeutic quantity of psyllium and prepared as in Example 12, above was tested with the psyllium-containing intermediate nugget product prepared in accordance with Example 6 above. The psyllium-containing bran flakes were provided in the diet at four different levels: 8.2%, 16.6%, 24.9% and 33.1%, all diets providing 10% TDF and between 1.3% and 5.3% TDF-NDF. The other two test prototypes were provided in the diet at about 33%, providing 10% TDF and 5.3% TDF-NDF.

Hence, six groups of Golden Syrian hamsters each were fed diets containing the different levels and kinds of psyllium-containing cereal products described. A control group of Golden Syrian hamsters was fed conventional unprocessed wheat bran instead of a psyllium-containing cereal product. The test material compositions are shown in Table 16, and the test diet compositions are shown in Table 17.

TABLE 16

| | Composition (%) of Test Materials | | | |
|---|---|---|---|---|
| | WB[1] | BF-P[2] | SK-P[3] | P nuggets[4] |
| Water | 9.54 | 2.65 | 3.2 | 2.3 |
| Ash | 6.1 | 3.8 | 3.03 | 3.56 |
| Fat | 5.33 | 1.40 | 0.2 | 0.6 |
| Protein | 16.99 | 10.95 | 6.3 | 9.0 |
| NDF | | 14.25 | 3.0 | 6.8 |
| TDF | 39.4 | 30.2 | 16.6 | 22.6 |
| TDF-NDF | | 15.9 | 13.6 | 15.8 |
| Sugars | | 11.0 | 14.6 | 12.6 |
| Starch[5] | 20.6 | 40.0 | 56.07 | 49.34 |
| Sodium, mg | 0.04 | 604 | 809.86 | 820.4 |

[1]Wheat bran
[2]Psyllium-containing bran flakes
[3]Psyllium-containing rice flakes
[4]Psyllium-containing additive of the present invention
[5]Calculated

TABLE 17

| | WB | BF-P | BF-P | BF-P | BF-P | SK-F | P-ns |
|---|---|---|---|---|---|---|---|
| Test material | | | | | | | |
| (% of diet) | 0 | 33.1 | 24.85 | 16.55 | 8.20 | 38.68 | 33.29 |
| Wheat bran (% of diet) | 25.4 | 0 | 6.35 | 12.7 | 19.1 | 9.09 | 6.29 |
| TDF (% of test material) | 39.4 | 30.2 | | | | 16.6 | 22.6 |
| TDF-NDF (% of test material) | | 15.9 | | | | 13.6 | 15.8 |
| TDF (% of diet) | 10.0 | 20.0 | 10.0 | 10.0 | 10.0 | 10.0 | |
| TDF-NDF (% of diet) | 0 | 5.27 | 3.95 | 2.64 | 1.32 | 5.26 | 5.26 |
| casein (89.3%) | 17.62 | 18.38 | 18.20 | 18.01 | 17.81 | 18.00 | 17.90 |
| DL-meth | 0.15 | 0.15 | 0.15 | 0.15 | 0.15 | 0.15 | 0.15 |
| L-lysine | 0.1 | 0.1 | 0.1 | 0.1 | 0.1 | 0.1 | 0.1 |
| beef tallow | 7 | 7 | 7 | 7 | 7 | 7 | 7 |
| safflower oil | 3.65 | 4.54 | 4.31 | 4.09 | 3.86 | 4.44 | 4.46 |
| coconut oil | 2 | 2 | 2 | 2 | 2 | 2 | 2 |

TABLE 17-continued

|  | WB | BF-P | BF-P | BF-P | BF-P | SK-F | P-ns |
|---|---|---|---|---|---|---|---|
| starch | 26.85 | 18.84 | 20.84 | 22.84 | 24.84 | 8.52 | 14.35 |
| sucrose | 15 | 11.36 | 12.27 | 13.18 | 14.09 | 9.35 | 10.87 |
| AIN vit mix | 1.2 | 1.2 | 1.2 | 1.2 | 1.2 | 1.2 | 1.2 |
| AIN mineral (—NaCl) mix | 4 | 4 | 4 | 4 | 4 | 4 | 4 |
| NaCl | 0.5 | 0 | 0.12 | 0.24 | 0.36 | 0.19 | 0.22 |
| choline Cl | 0.5 | 0.5 | 0.5 | 0.5 | 0.5 | 0.5 | 0.5 |
| cholesterol | 0.125 | 0.125 | 0.125 | 0.125 | 0.125 | 0.125 | 0.125 |
| Total Additives (mg): | 104.10 | 100.30 | 102.02 | 102.69 | 103.34 | 103.35 | 102.46 |
| Riboflavin | 0.3 | 0 | 0.08 | 0.16 | 0.24 | 0.37 | 0.38 |
| Niacin | 0 | 2.15 | 1.61 | 1.07 | 0.53 | 4.36 | 5.11 |
| Folic acid | 0.1 | 0 | 0.03 | 0.05 | 0.07 | 0.1 | 0.1 |
| Fe Citrate | 0 | 2.25 | 1.66 | 1.07 | 0 | 7.17 | 8.40 |
| ZnCO3 (70% ZnO)* | 3.0 | 0 | 0.68 | 1.39 | 2.07 | 4.93 | 5.30 |
| K3CitrateH2O | 0 | 522.4 | 389.0 | 260.0 | 130.0 | 549.0 | 642.0 |
| K2SO4 | 0 | 123 | 92.0 | 61.0 | 31.0 | 129.0 | 152.0 |
| Actual amount of elemental mineral added (in mg): | | | | | | | |
| Fe | 0 | 0.42 | 0.31 | 0.20 | 0 | 1.34 | 1.57 |
| Zn | 1.57 | 0 | 0.39 | 0.79 | 1.18 | 2.81 | 3.02 |
| K | 0 | 244 | 183 | 122 | 61 | 258 | 302 |

*ZnCO3 2ZnO 3H2O

Serum cholesterol levels of the seven groups of hamsters were measured after 3 weeks of being fed the diet prescribed in Table 17. The results are shown in Table 18.

TABLE 18

| | Serum cholesterol Levels: | | | | | | |
|---|---|---|---|---|---|---|---|
| | WB | BF-P | BF-P | BF-P | BF-P | SK-P | P-ns |
| TC, mg/dl | 226 | 124 | 145 | 164 | 202 | 120 | 145 |
| HDLC, mg/dl | 163 | 92 | 100 | 120 | 151 | 94 | 111 |
| HDLC/TC, % | 72 | 74 | 69 | 73 | 75 | 78 | 77 |

As shown, this study demonstrates the significant cholesterol lowering effect of all three psyllium-containing samples compared to the wheat bran control, with the psyllium-containing bran flakes showing a significant dose-response effect.

While not intending to be bound by any scientific theory, it is believed that the active psyllium ingredient for the psyllium enriched breakfast cereal and psyllium intermediate products of present invention is the mucilaginous water soluble complex carbohydrate material. This soluble gum is concentrated in the psyllium seed husk. By processing the psyllium husk in accordance with the present invention, the therapeutic benefits possible from ingesting the psyllium gum can be achieved while at the same time masking the organoleptic drawbacks associated with prior attempts to incorporate psyllium in other type food products.

In addition to hypocholesterolemic effect of the psyllium-containing products of the present invention, it is believed that these products produce other therapeutic benefits when ingested by animals. More specifically, it is believed that the products of the present invention can be effective in lowering glycemic index and as a laxative more effective than psyllium alone.

Further, it is believed that other ingredients, such as fruit compositions, nuts, and the like, to add flavor and/or texture can be added to the ready-to-eat cereal of the present invention without departing from the spirit and scope of the invention. Further, it is not intended that the present invention be limited to only the described embodiments. Modification of these embodiments will undoubtedly be recognized by those skilled in the art. Rather, the invention should be circumscribed by the scope of the appended claims.

We claim:

1. A psyllium-containing ready-to-eat cereal product comprising on a dry weight basis 62% heavy wheat bran; 26% light wheat bran; and 2% psyllium.

2. The ready-to-eat cereal of claim 1 further comprising salt, malt syrup, vitamins and minerals.

3. The ready-to-eat cereal of claim 2 further comprising sucrose and high fructose corn syrup.

4. The ready-to-eat cereal of claim 1 in the shape of a biscuit.

5. A psyllium-containing ready-to-eat cereal product having a good mouth feel, textural and flavor characteristics comprising, on a dry weight basis 62% heavy wheat bran; 26% light wheat bran; and 2% psyllium, the reminder comprising sweetening products, vitamins and minerals.

6. A process for making a psyllium-containing ready-to-eat cereal of claim 1 comprising:

heating the required amount of heavy bran;

mixing light bran and psyllium with the heavy bran to form a mixture; and cooking the mixture to form a cooked product.

7. The process of claim 6 wherein flavor ingredients are added to the heavy bran.

8. The process of claim 6 wherein the cooled product is shredded into biscuit shapes.

9. The process of claim 8 wherein the biscuit shapes are toasted.

10. A psyllium-containing ready-to-eat cereal product comprising on a dry weight basis 49% wheat bran; 9% corn bran; and 13% psyllium.

11. The ready-to-eat cereal of claim 10 further comprising flavoring ingredients.

12. The ready-to-eat cereal of claim 11 further comprising vitamins and minerals.

13. The ready-to-eat cereal of claim 10 in the form of extruded morsels.

14. The ready-to-eat cereal of claim 11 wherein the flavoring ingredients comprise sugar and corn syrup.

15. The psyllium-containing ready-to-eat cereal product having a good mouth feel, textural and flavor characteristics comprising on a dry weight basis 49% wheat bran; 9% corn bran; and 13% psyllium.

* * * * *